United States Patent Office
3,824,079
Patented July 16, 1974

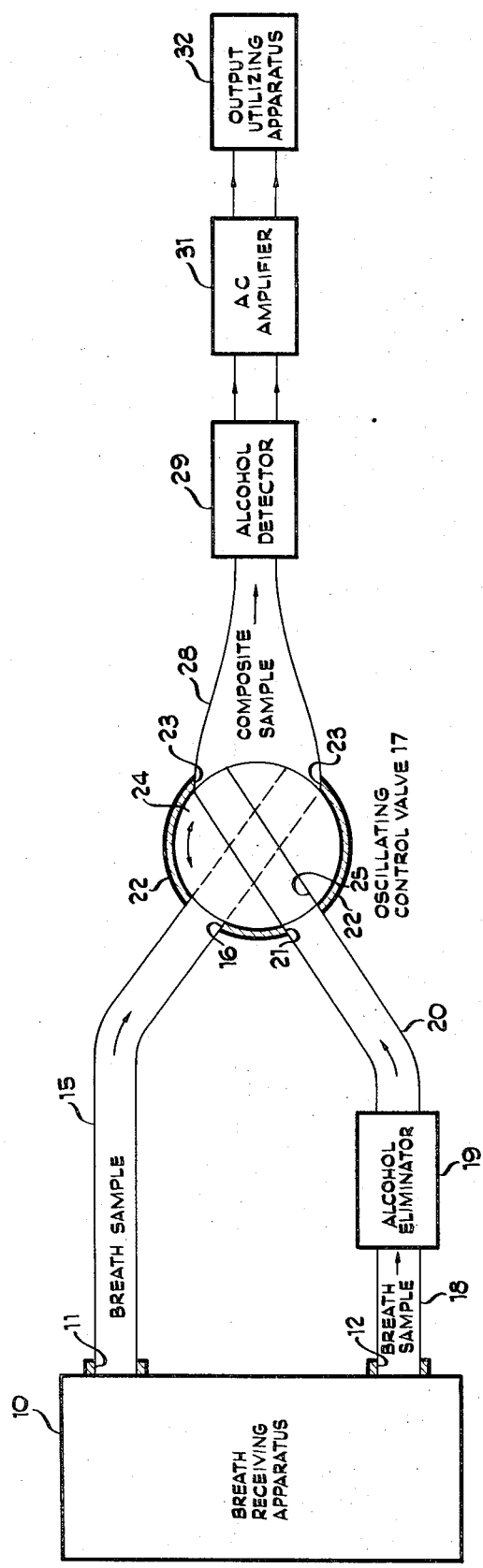

3,824,079
BREATH TESTING SYSTEM
Harry J. Venema, Wheaton, Ill., assignor to
Borg-Warner Corporation, Chicago, Ill.
Filed June 5, 1972, Ser. No. 259,415
Int. Cl. A61b 5/08; G01n 33/16
U.S. Cl. 23—254 E                                        9 Claims

ABSTRACT OF THE DISCLOSURE

An alcoholic breath analyzer which effectively responds only to alcohol content of a subject's breath. It is immune to other breath constituents, as well as to temperature variations, that could otherwise have an adverse effect and lead to false test results. This immunity is achieved by alternately supplying to the input of an alcohol detector two breath samples identical to each other except that alcohol, if any, has been removed from one of them. In this way, the samples reaching the detector will be the same when the subject's breath is alcohol-free and any reaction to those samples will be constant. As a consequence, the instantaneous amplitude of the output signal from the detector remains substantially fixed (namely the signal will have a constant amplitude D.C. component) even though the detector may respond to and be affected by the non-alcohol constituents and by temperature changes. On the other hand, when breath alcohol is present, the chopping process effects delivery of that alcohol to the detector in time-spaced pulses or bursts and this causes the detector's output signal to vary in accordance with a square wave function and in step or synchronism with the switching between samples at the detector's input. The peak-to-peak amplitude of the resulting A.C. component will accurately represent the breath alcohol concentration.

BACKGROUND OF THE INVENTION

Various breath testing systems have been developed for evaluating a person's breath to detect its alcohol level. In one well known system, a sample of the breath to be analyzed is passed over a heated catalyst resistance element, constituting one leg of a normally-balanced wheatstone bridge, where any alcohol present in the breath sample oxidizes. The heat of the oxidation reaction causes the temperature and consequently the resistance of the catalytic element to increase, and this in turn unbalances the bridge and produces an output information signal indicating the particular alcohol level in the breath sampled.

To render the bridge type alcohol detector immune to any deleterious effects otherwise caused by thermoconductivity, thermal changes, convection, etc., one of the legs adjacent to the catalytic leg is usually formed of a non-catalyst but, in all other respects, identical resistance element and both of the resistance elements are simultaneously exposed to the same breath sample. With that arrangement, any change in either the catalytic or non-catalytic leg is balanced out by an equal and compensating change in the other leg. In the absence of such compensation, erroneous test results would manifest.

While a conventional bridge type alcohol detector has many advantages, there are some shortcomings. One disadvantage is that balancing is very critical. Unless it is precisely balanced, proper operation will not be obtained. Another disadvantage is that operation of a bridge type detector is adversely effected by certain constituents of a person's breath, and heretofore it has not been possible to neutralize the effect of those constituents. Specifically, non-alcohol breath components, such as water and carbon dioxide, cause changes in the resistance of the catalytic leg, thereby resulting in the development of a false output signal which does not accurately represent the alcohol level of the breath sampled. This undesired response to water and carbon dioxide is probably due to absorption which causes the temperature of the catalyst resistance element to increase.

The present invention constitutes a significant improvement over prior breath analyzers since inter alia it does not require any critical balancing and since its operation is effectively immune to non-alcohol breath constituents such as water and carbon dioxide. It provides test results that reflect solely the breath alcohol concentration and cannot be influenced by any other factors. The breath testing system herein disclosed performs an extremely accurate test, and yet this is achieved without employing highly sophisticated, complex and expensive testing apparatus.

SUMMARY OF THE INVENTION

A breath testing system, constructed in accordance with the invention, comprises breath receiving apparatus for providing first and second identical samples of breath received from a person to be tested. There is an alcohol removal stage for eliminating alcohol content from the second sample. An alcohol detector is provided to produce an output signal in response to the presence of alcohol in any gas sample applied thereto. Selecting or switching means, such as an oscillating control valve, alternately supplies the first sample and the alcohol-free second sample to the alcohol detector, the resulting output signal from the detector having an A.C. component, when the first sample contains alcohol, of an amplitude proportional to and indicative of the alcohol level. The output signal is subject to also having a D.C. component of an amplitude dependent on temperature conditions and non-alcohol breath constituents. The switching means operates in accordance with a square-wave function, as a result of which the A.C. component will be square-wave shaped and have a frequency determined by the switching rate. An ouput utilizing apparatus, such as an AC meter, is controlled by and is responsive only to the A.C. component.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing, the single figure of which illustrates, partly in block diagram form, a breath testing system constructed in accordance with one embodiment of the invention.

DESCRIPTION OF THE ILLUSTRATED EMBODIMENT

Breath receiving apparatus 10 develops, in response to breath received from a subject being tested, a pair of identical samples of that breath at respective ones of outlets 11 and 12. Apparatus 10 may take any suitable construction to facilitate the receipt of breath blown or exhaled by the person and to deliver identical samples of that received breath to outlets 11 and 12, the unused breath being vented or dumped to the atmosphere. One example of an appropriate form for apparatus 10 is found in co-pending application Ser. No. 136,778, filed Apr. 23, 1971 in the names of Donald W. Collier, Joseph P. Hoppesch and Anthony C. Mamo, and issued Oct. 9, 1973 as Pat. 3,764,270. The breath receiving apparatus illustrated and described in that copending application has only one outlet and thus provides only one breath sample. However, it may very easily be modified to have two outlets in order to simultaneously produce the two identical samples needed in the breath testing system herein disclosed.

While not essential for the proper operation of the present invention, apparatus 10 preferably includes an appropriate control device to make certain that the identical output samples constitute deep lung breath. Suitable control equipment to perform that function is also illustrated and described in the aforementioned copending application Ser. No. 136,778. There, a breath sample is not produced at the output of the breath receiving apparatus until a continuous uninterrupted breath flow has occurred for a predetermined time period, such as five seconds. A sample taken at the end of a five-second interval of uninterrupted blowing or exhaling constituents deep lung breath, from which an accurate reading of blood alcohol level may be obtained as is well known in the art.

As also shown in copending application Ser. No. 136,778 breath receiving apparatus 10 may include a series of heaters and temperature sensors to insure accurate testing under extreme conditions of use.

As diagrammatically shown by channel or conduit 15, a breath sample emanating at outlet 11 is conveyed directly to one inlet 16 of a switching means in the form of an oscillating control valve 17. Simultaneously, the counterpart identical sample produced at outlet 12 is delivered through a channel 18 to an alcohol removal stage or eliminator 19, the outlet of which is supplied via a channel 20 to another inlet 21 of valve 17. Stage 19 may be of any suitable construction in order to remove only the alcohol content from the sample produced at outlet 12. For example, eliminator 19 may merely constitute a heated catalyst such as a platinum wire. Valve inlet 21 thus receives a breath sample identical to that received at inlet 16 with the sole exception of the alcohol constituent. In this way, if the sample reaching inlet 16 contains any non-alcohol constituents that would ordinarily deleteriously affect and interfere with alcohol detection, those very same constituents will appear in the sample reaching inlet 21. Moreover, the temperature conditions of the samples received at inlets 16 and 21 will be the same.

Control valve 17 serves as a gas chopper or diverter. It has a fixed housing 22, with a circular cross-section, in which inlets 16 and 21 are formed, along with a single large outlet 23. Rotatably mounted within housing 22 is a valve member 24, of circular cross-section, which oscillates or pivots back and forth over an angular distance covering approximately 80°. A conduit 25 is bored through valve member 24 along its diameter and as that member rocks back and forth over its 80° of limited travel, conduit 25 alternately couples inlets 16 and 21 to outlet 23. In other words, in one extreme position of travel (shown in full line construction in the drawing) conduit 25 supplies to outlet 23 only the alcohol-free sample delivered to inlet 21, whereas when valve member 24 is pivoted to its other extreme position (shown in dashed line construction), only the sample at inlet 16 will be channeled to outlet 23. Preferably, valve 17 switches between inlets 16 and 21 in accordance with a square-wave function. The dwell times for the two extreme positions will be equal and relatively long, and the switching time required to travel from one to the other of those positions will be negligible compared to the duration of each dwell time interval.

As valve member 24 switches back and forth to alternately select the breath samples at inlets 16 and 21 for delivery to outlet 23, a resulting composite sample will be produced at that outlet and will be made up of a series of periodically recurring time-spaced bursts from inlet 16 between which are dovetailed a series of periodically recurring time-spaced bursts from inlet 21. Since the samples at inlets 16 and 21 are identical, with the exception of alcohol which may be present in the sample at inlet 16, the non-alcohol breath constituents will be constant in the composite sample at outlet 23. Moreover, its temperature will be relatively constant with respect to the time interval covered by the series of bursts from inlet 16.

Outlet 23 is coupled through a channel 28 to the inlet of an alcohol detector 29 which may take any of a variety of different forms in order to produce an output signal in response to the presence of alcohol in any gas sample applied thereto. Since one of the salient features of the invention resides in obviating the need for a relatively complex bridge type alcohol detector, detector 29 may merely include an alcohol sensing element that reacts to alcohol and develops an output signal. For example, the sensing element may be of the fuel cell type which directly generates a signal in response to alcohol. Preferably, however, the sensing element in detector 29 is a heated catalyst resistance element through which direct current constantly flows from a source of D.C. operating potential. The detector's output signal is determined by the current flowing through the resistance element. In the absence of any input to the detector, the output signal will have a D.C. component of constant amplitude. The composite sample from outlet 23 flows over the catalytic element and any alcohol therein oxidizes, the heat of oxidation causing the temperature and thus the resistance of the element to increase to an extent directly proportional to the alcohol level or concentration. Varying the resistance in turn varies the instantaneous amplitude of the detector's output signal.

In operation of the invention, assume initially that the subject's breath contains no alcohol. In that case, the samples applied to inlets 16 and 21 will be identical, as a result of which the entire composite sample applied to acohol detector 29 will remain constant. During any given time interval the composition of the composite sample will be identical to that occurring during any other interval. The temperature of the composite sample may vary over a relatively long period, but this can only result in a slight amplitude change in the D.C. component of the detector's output signal. Since any non-alcohol constituents that could otherwise influence the detector will occur continuously in the composite sample, the effect of those constituents will also be limited to a possible change in the D.C. component of the detector's output signal.

For example, when the sensing element in detector 29 comprises a catalytic resistance element and when water and carbon dioxide occur in both samples reaching inlets 16 and 21, any reaction and resistance change of the catalytic element will be continuous as a result of which only the amplitude level of the D.C. component will vary. To explain, the temperature of the catalytic element is likely to increase (probably due to absorption) and this will increase the resistance of the element and vary the amplitude of the output signal. However, once the signal has assumed a different amplitude level it will remain at that new level since the water and carbon dioxide appear in the composite sample without interruption. Hence, only the D.C. amplitude of the output signal is affected. In this way, in the absence of alcohol in the composite sample, there is absolutely no way for the A.C. amplitude of the detector's output signal to vary. By switching between inlets 16 and 21 in accordance with a square wave function and by making each switching time interval of negligible duration compared to each dwell time interval, detector 29 may easily be designed to be unresponsive to the extremely high frequency of the switching transients. This precludes the introduction into the detector's output signal of an A.C. component as a result of the switching action.

When alcohol is present in the samples emanating at outlets 11 and 12, that alcohol will appear in the composite sample as time-spaced pulses or bursts. This occurs since the breath sample reaching inlet 21 is made alcohol-free by alcohol eliminator 19 and thus the alcohol component is inserted in the composite sample only when movable valve member 24 connects inlet 16 to outlet 23. In other words, the alcohol constituent is effectively chopped into a series of periodically recurring bursts. Each such burst is sensed by detector 29 and in response to its leading and trailing edges, the instantaneous amplitude of the detector's output signal changes. An A.C. component is therefore provided in the output signal and the peak-to-peak amplitude of that component will be proportional to and indicative of the alcohol level. The A.C.

amplitude of the output signal is thus representative of alcohol concentration only, and no other breath constituent or condition, such as temperature, can result in such an A.C. component.

Appropriate output apparatus may be provided to utilize the A.C. component directly as it is produced in the detector's output. Preferably, and as shown in the drawing, the component is initially amplified in an AC amplifier 31 before it is applied to an output utilizing apparatus 32. With this arrangement, the system may be extremely sensitive and may very accurately measure the alcohol concentration. Apparatus 32 may include an AC meter which effectively measures the A.C. component, thereby providing a visual display of the alcohol concentration in the tested breath sample. Alternatively, the output apparatus can be a simple bulb energized when the A.C. component exceeds a predetermined threshold amplitude level. Apparatus 32 may take any of many different forms inasmuch as there are several devices that may be controlled by an A.C. signal whose peak-to-peak amplitude signifies the alcohol level of a person's breath.

The invention provides, therefore, an improved breath testing system which responds only to alcohol content to develop an output signal truly representative of that alcohol content. It is effectively unresponsive to temperature conditions and to all non-alcohol constituents which in the past have deleteriously affected the operation of breath analyzers.

While a particular embodiment of the invention has been shown and described, modifications may be made, and it is intended in the appended claims to cover all such modifications as may fall within the true spirit and scope of the invention.

I claim:
1. A breath testing system for determining the breath alcohol concentration of a person, comprising:
   breath receiving apparatus for providing first and second substantially identical samples of breath received from a person;
   an alcohol removal stage for eliminating alcohol content from said second sample;
   an alcohol detector;
   switching means for alternately supplying said first sample and said alcohol-free second sample to said alcohol detector, said detector thereby producing an output signal having an A.C. component, when said first sample contains alcohol, of an amplitude proportional to and indicative of the alcohol level and subject to also having a D.C. component of an amplitude dependent on temperature conditions and non-alcohol breath constituents;
   and output utilizing apparatus controlled by and responsive only to said A.C. component.

2. A breath testing system according to Claim 1 and including an AC amplifier for amplifying said A.C. component before application to said output utilizing apparatus.

3. A breath testing system according to Claim 1 in which said switching means operates in accordance with a square-wave function and in accordance with a predetermined switching rate, and in which the frequency of said A.C. component is determined by said switching rate.

4. A breath testing system according to Claim 1 in which said switching means includes an oscillating control valve.

5. A breath testing system according to Claim 1 in which said switching means effectively selects said first sample and said alcohol-free second sample to produce, for application to said alcohol detector, a composite sample of relatively constant temperature and having relatively constant non-alcohol breath constituents, any alcohol in said first sample appearing as pulses in said composite sample.

6. A breath testing system according to Claim 5 in which said alcohol detector includes a heated catalyst over which said composite sample flows, the resistance of said catalyst changing in response to alcohol in said composite sample.

7. A breath testing system according to Claim 1 in which the peak-to-peak amplitude of said A.C. component is directly proportional to the alcohol concentration in said first sample, and in which said output apparatus includes an AC meter for indicating that amplitude.

8. A breath testing system according to Claim 1 in which said breath receiving apparatus provides said first and second identical samples only when deep lung breath is received from the person.

9. A breath testing system according to Claim 1 in which said alcohol removal stage includes a heated catalyst over which said second sample flows.

References Cited

UNITED STATES PATENTS

| | | | |
|---|---|---|---|
| 3,147,465 | 9/1964 | Brown et al. | 340—237 R |
| 3,239,828 | 3/1966 | Peterman | 340—237 R |
| 3,558,283 | 1/1971 | Freeman et al. | 73—27 R X |
| 3,613,665 | 10/1971 | Gorsuch | 23—254 R X |

ROBERT M. REESE, Primary Examiner

U.S. Cl. X.R.

23—255 E; 73—27 R; 128—2.08